US010439889B2

United States Patent
Padhye et al.

(10) Patent No.: US 10,439,889 B2
(45) Date of Patent: Oct. 8, 2019

(54) HIGH FIDELITY NETWORK EMULATION

(71) Applicant: Microsoft Technology Licensing, LLC, Redmond, WA (US)

(72) Inventors: Jitendra D Padhye, Redmond, WA (US); Hongqiang Liu, Woodinville, WA (US); Yibo Zhu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 15/596,889

(22) Filed: May 16, 2017

(65) Prior Publication Data

US 2018/0337830 A1    Nov. 22, 2018

(51) Int. Cl.
| | | |
|---|---|---|
| G06F 13/10 | (2006.01) | |
| H04L 12/24 | (2006.01) | |
| H04L 12/26 | (2006.01) | |
| G06F 9/455 | (2018.01) | |

(52) U.S. Cl.
CPC ........ H04L 41/145 (2013.01); G06F 9/45558 (2013.01); H04L 41/0856 (2013.01); H04L 41/0863 (2013.01); H04L 41/12 (2013.01); H04L 41/147 (2013.01); H04L 43/50 (2013.01); G06F 2009/45579 (2013.01); G06F 2009/45595 (2013.01); H04L 41/0806 (2013.01); H04L 41/20 (2013.01)

(58) Field of Classification Search
CPC .................................................... H04L 41/145
USPC .......................................................... 703/21
See application file for complete search history.

(56) References Cited

U.S. PATENT DOCUMENTS

| | | |
|---|---|---|
| 7,555,421 B1 | 6/2009 | Beckett et al. |
| 9,183,121 B2 | 11/2015 | Pruss et al. |
| 2009/0043561 A1 | 2/2009 | Arieli et al. |
| 2014/0047079 A1 | 2/2014 | Breternitz et al. |

OTHER PUBLICATIONS

Liu, et al., "Model-Driven Network Emulation with Virtual Time Machine", In Proceedings of the Writer Simulation Conference, Dec. 5, 2010, pp. 688-696.
Hibler, et al., "Large-scale Virtualization in the Emulab Network Testbed", In Proceedings of USENIX Annual Technical Conference, Jun. 22, 2008, 24 pages.
Roy, Arup Raton, "Scalable Emulator for Software Defined Networks", In thesis of University of Waterloo, 2015, 73 pages.

(Continued)

*Primary Examiner* — Hugh M Jones
(74) *Attorney, Agent, or Firm* — Schwegman Lundberg & Woessner, P.A.

(57) ABSTRACT

Systems, methods, and computer-executable instructions for emulating a network are disclosed. A network topology and an indication of devices to emulate are received. A safe static boundary within the network that comprises each device in the indication of devices to emulate is determined. The safe static boundary is based upon the network topology. For each device to emulate, a unified container and a device container are instantiated. An emulated device is based on the unified container and the device container. Data links between the emulated devices are created based upon the network topology. An emulated network is created using the emulated devices.

20 Claims, 11 Drawing Sheets

(56) References Cited

OTHER PUBLICATIONS

Flynn, et al., "A Real Time Emulation System for Ad hoc Networks", In Proceedings of the Communication Networks and Distributed Systems Modeling arid Simulation Conference, Jan. 27, 2002, 6 pages.

Bavier, et al., "In VINI Veritas: Realistic and Controlled Network Experimentatio", In Proceedings of the conference on Applications, technologies, architectures, and protocols for computer communications, Sep. 11, 2006, pp. 3-14.

Callegati, et al., "Performance of Network Virtualization in Cloud Computing Infrastructures: The OpenStack Case", In Proceedings of IEEE 3rd International Conference on Cloud Networking, Oct. 8, 2014, 6 pages.

Lemay, et al., "An isolated virtual cluster for SCADA network security researc", In Proceedings of the 1st International Symposium on ICS & SCADA Cyber Security Research, Sep. 16, 2013, pp. 88-96.

"Google Compute Engine Incident", https://status.cloud.google.com/incident/compute/16007, Published on: Apr. 12, 2017, 6 pages.

"International Search Report and Written Opinion Issued in PCT Application No. PCT/US18/028737", dated Jul. 18, 2018, 12 Pages.

US 10,439,889 B2

HIGH FIDELITY NETWORK EMULATION

BACKGROUND

Network reliability is critical for online services and cloud providers. However, their networks are large, heterogeneous, complex and undergo constant churn. In such an environment, even small issues triggered by device failures, buggy device software, configuration errors, unproven management tools and unavoidable human errors can quickly cause outages. Network emulators are one way to help reduce these issues. Network emulation allow users to define network topologies and capacities. Realistic applications may then be ran over the emulated network. Current network emulations, however, do not support various features such as customized switch firmware or have on-demand scalability based on the limited size the infrastructure used to run the emulated network.

DETAILED DESCRIPTION

Figure 1:
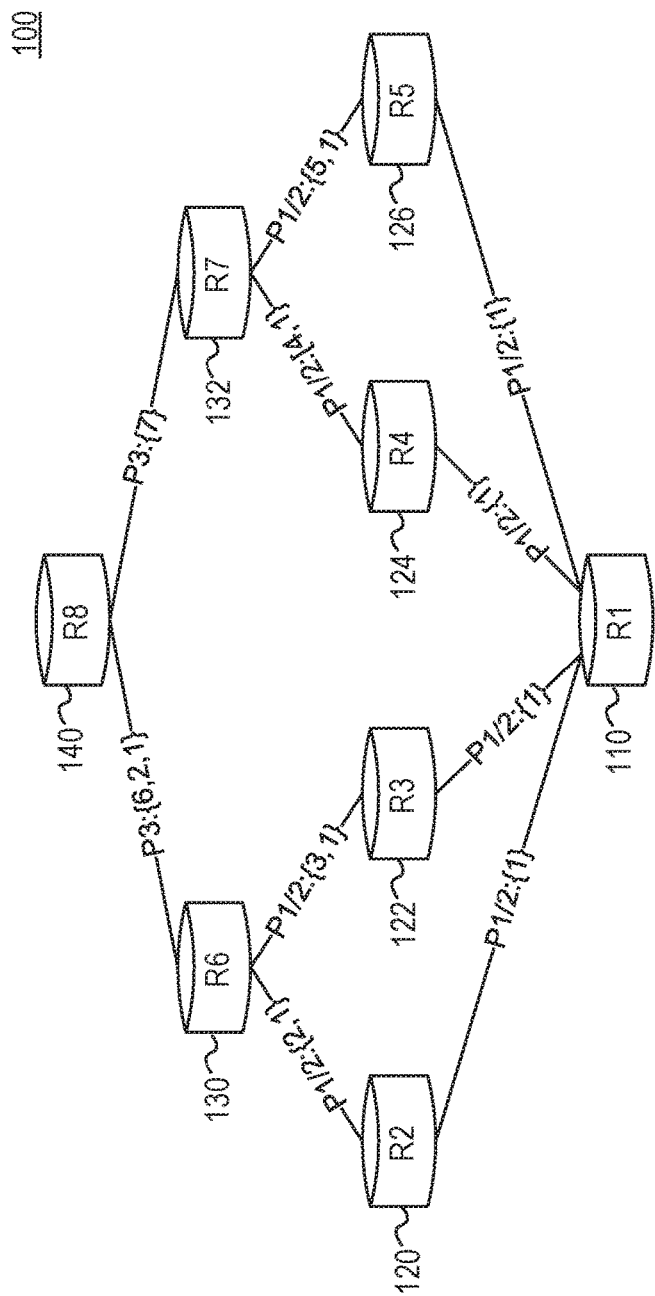
FIG. 1 is a block diagram of a network that has traffic load imbalance issue in accordance with respective examples.

In accordance with techniques described herein, a high fidelity, network emulator helps improve the overall reliability of large networking infrastructures. A reliable and performant networking fabric is critical to meet the availability that may be required from a customer's service level agreement. A network may consist of tens of thousands of devices, sourced from numerous vendors, and deployed across the globe. These devices may run complex routing software and have complex configurations. Furthermore, churn may be present in managing the network with frequent upgrades, new deployments and other changes.

One issue with such a large and complex environment, is that even small changes or failures can have unforeseen and near disastrous consequences. To avoid such issues, small hardware testbeds may be used to unit-test or stress-test new network devices before they are added to the network. This testing is useful, but cannot reveal problems that arise from complex interactions in a large topology. There are also network verification tools that ingest topology and configuration files, and compute forwarding tables by simulating the routing protocols. These forwarding tables may be analyzed to answer a variety of reachability questions. However, these tools cannot account for bugs in routing software. Nor can the tools account for subtle interoperability issues that result from slight differences in different vendors' implementation of the same routing protocol. In other words, these tools are not "bug compatible" with the corresponding production network. In one analysis of network issues, nearly 36% of the problems are caused by such software errors. Unfortunately, there is no way to make these tools bug compatible. Often, the bugs are unknown to the device vendors themselves until they manifest under certain conditions. In addition, these tools may present a very different workflow to the operators of the network. This means these tools are not ideal for preventing human errors.

A large scale, high fidelity network emulator, however, may allow planned changes to be validated and for the impact of various failure scenarios to be gauged. High fidelity means that the emulator accurately mimics the behavior of the production network, especially in the control plane. Further, the high fidelity network emulator may allow engineers to use the exact same tools and workflows that are used on the production network. In contrast, full fidelity requires creating a complete replica of the production network, which is infeasible for large networks. In an example, the network dataplane (latency, link bandwidth, traffic volume etc.) is not faithfully emulated. The control plane, however, is more faithfully emulated.

To accurately mimic the control plane, real network device firmwares may be run virtualized sandboxes, e.g., containers and virtual machines (VMs) and interconnects the device sandboxes with virtual links to mimic the real topology. The real configurations are loaded into the emulated devices, and real routing states are injected into the emulated network.

The same tools and scripts used to interact with the production network may be used to interact with the emulated network. Packets may be injected into the emulated network and the paths of the packets may be monitored. In an example, the emulated network may even be extended to include real hardware in the emulated network.

In an example, the emulated network may emulate a network of 5,000 devices. Using the architecture described below, this network may be emulated using 500 virtual machines that each has four cores and 8 GB of RAM. Thus, the emulated network may be ran and test for as little as $100 an hour using current cloud based providers.

The architecture of the emulated network has various features such as being able to scale to emulate large, heterogeneous networks. The architecture may use multiple public and/or private clouds. The emulation state of the network may be saved and restored, which may be useful due to virtual machine failures. In addition, an emulated network can accommodate a diverse range of router software images from various vendors. The router images may be standalone VMs or docker containers. To accommodate and manage these router images uniformly, a mock-up physical network with homogeneous containers are used to run heterogeneous device sandboxes on top of the containers' network namespace. In addition, routers and other devices may be accessed in a standard manner via telnet or secure shell (SSH). An emulated network may also include in a transparent manner on-premise hardware devices.

Another feature is that an emulated network may accurately mock-up external networks transparently to emulated networks. An emulated network may have a boundary, beyond which there are no emulated devices. For example, external networks may not be emulated. Accurately emulating these external networks may be impossible since various configurations and firmware of devices may not be available. To emulate a boundary, a lightweight passive agent may be used that mimics the announcements emulated devices would receive from beyond the boundary. Since the agents do not respond to dynamics in the emulated network, the correctness of the results may be ensured by identifying and searching for a safe boundary. Computing the right boundary may also save resources as the right boundary may cut the cost of emulation by 94-96% while maintaining high fidelity.

There are various types of network incidents that may impact customers. One cause of incidents are software bugs. A variety of bugs may exist in device firmware or in network management tools. For example, new router firmware from a vendor erroneously stopped announcing certain Internet Protocol (IP) prefixes. In another case, address resolution protocol (ARP) refreshing failed when peering configuration was changed. Another set of incidents arise out of ambiguity, rather than bugs. Different versions of the network devices from the same vendor usually have slightly different configuration definitions. For instance, a vendor changed the format of Access Control Lists (ACLs) in a new release. The old configurations on the new firmware, however, caused security leaks. Devices may exhibit vendor-dependent behavior in the implementation of otherwise standard protocols/features, e.g., how to select Border Gateway Protocol (BGP) paths for aggregated IP prefixes, or how to process routes after forwarding information base (FIB) is full, etc. Such corner cases may not be well documented making incidents possible and hard to avoid.

For example, FIG. 1 is a block diagram of a network 100 that has traffic load imbalance issue in accordance with respective examples. In the network 100 IP prefixes P1 and P2 belong to router R1 110 with autonomous system (AS) number "1". When higher layer routers R6 130 and R7 132 get the announcements of these two prefixes, they would like to aggregate the two prefixes into a single prefix (P3). However, routers R6 130 and R7 132 are from different vendors, and they may have different behaviors to select the AS path of P3. For example, R6 130 learns different paths for P1 and P2 from R2 120 (with AS path 2,1) and R3 122 (with AS path 3,1) and it selects one of them and appends its own AS number before announcing P3 to R8 140 (6,2,1 in this example); R7 132 faces a similar situation, but it does not select any paths and only puts its AS number as the AS path in the announcement of P3 to R8 140, without adding paths through R4 124 and R5 126. As a result, R8 140 may always prefer to send packets for P3 to R7 132 because it thinks R7 132 has a lower cost, causing sever traffic imbalance.

Another source of network issues may be configuration bugs. Network configurations control behavior of routing protocols and account for issues like forwarding table capacity, CPU load of devices, IPv4 shortage and reuse, security and access control, etc. Taken together, this makes network configuration policies quite complicated. Human errors may also cause incidents. Thus, various types of bugs may affect large, complex networks. Testing and planning with various high fidelity network emulators described herein may catch many issues before the issues disrupt production networks.

Various examples of the described emulated networks may be easy to scale out on network platforms such as cloud platforms. This allows emulation of large networks. For instance, a single datacenter can consist of thousands of switches, and the scale is even larger when middleboxes and inter-datacenter scenarios are considered. Furthermore, each instance of switch software stack consumes non-trivial resources (e.g., CPU, RAM, etc.). The required resources for a faithful network emulation can easily go beyond a common commodity server. Thus, in an example, the emulated network may run in a distributed setting, e.g., on a set of VMs.

In addition, the ability to mock-up physical network may be transparently to heterogeneous software stacks is another feature. A switch operating system (OS) assumes it runs on top of a physical switch that has multiple network interfaces and connects to neighbor devices. Management tools may assume each network device can be visited via an IP address with Telnet or SSH. Thus, in an example, the emulated network creates virtual network interfaces, virtual links and virtual management networks that are transparent to switch OS and management tools, so that the latter can work without modifications.

Another feature is the ability to mock-up external networks transparently to emulated networks. An emulated network may have a boundary. For example, emulating a network that connects to the internet must have a boundary as it is not feasible to emulate the whole Internet.

Figure 2:
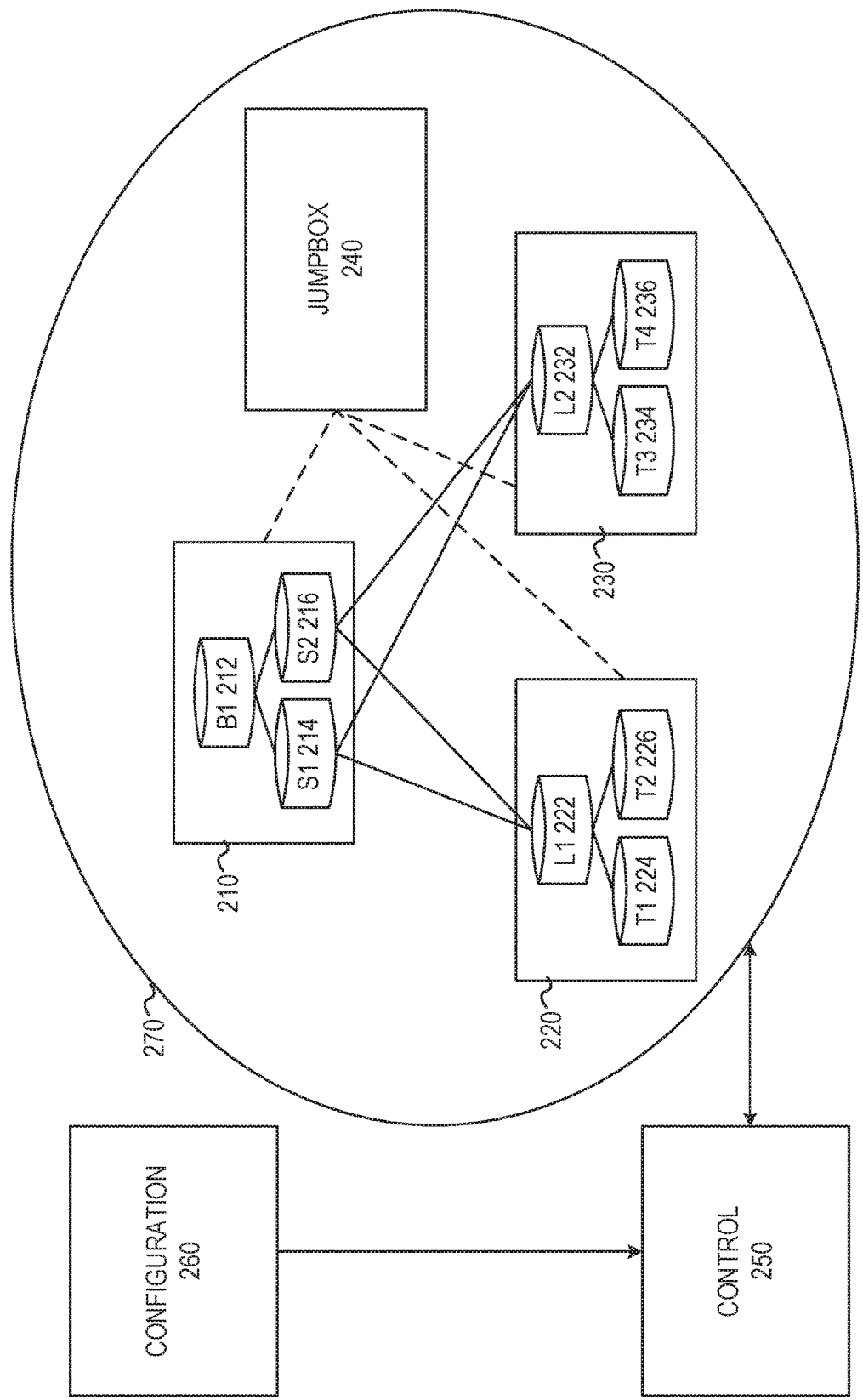
FIG. 2 is a block diagram of a high fidelity network emulation architecture in accordance with respective examples.

FIG. 2 is a block diagram of a high fidelity network emulation architecture in accordance with respective examples. A control 250 reads information 260, such as configuration information, of production networks. The control 250 may also provision VMs 210, 220, and 230 on clouds, starts device virtualization sandboxes (e.g., T1-T4 224, 226, 234, and 236; L1-L2 222 and 232; and S1-S2 214 and 216) in the VMs 210, 220 and 230, creates virtual interfaces inside the sandboxes, builds overlay networks among the sandboxes, and may introduce some external device sandboxes (e.g., B1 212) to emulate external networks.

The overlay network may be decoupled with the number and locations of the VMs, so that the same emulation can freely run on top of any VM cluster (with sufficient resources) without any modifications. This helps make the emulated network easy to scale-out The emulated network may be transparent. Each device's network namespace may have the same Ethernet interfaces as in the real hardware; the interfaces are connected to remote ends via virtual links which transfer Ethernet packets as real physical links; and the topology of the overlay network is identical with the real network it emulates. Therefore, from a device firmware's point of view, the firmware cannot distinguish that the firmware is running inside a sandbox or a real device. In addition, a management overlay network may be created which connects all devices and jumpbox VMs 240. Management tools can run inside the jumpboxes and visit the devices in the same way as in production.

The emulation boundary may be transparent. The external devices for emulating external networks provide the same routing information as in real networks. Also, positions of these external devices may be selected, such that the states of the emulated network are identical t real networks even if the emulated network is under chum.

Each VM does not need to know the setup of any other VMs. Combined with monitoring, the control 250 can easily detect and recover any VM or specific devices. On the other hand, the control 250 may allo provide a set of APIs whose behaviors are deterministic based on states in a global store (not shown). Since the control 250 executions and states are separated, the control 250 may be easily be replicated and run from anywhere.

A set of APIs may be provided by the control 250 for operators to configure, create, and delete emulations, and run various tests and observe network states for validations. The definitions of the APIs, as listed in Table 1.

TABLE 1

| API | Description |
| --- | --- |
| Prepare | Gather information for Mockup, spawn VMs |
| Mockup | Create the emulation based on Prepare output |
| Clear | Clean up VMs |
| Destroy | Erase all Prepare output, including VMs |
| Reload | Reboot devices with specified software version and configurations |
| Connect | Connect two interfaces |
| Disconnect | Disconnect two interfaces |
| InjectPackets | Inject packets with a specified header from a specified device and part, at a given frequency in a given amount of time |
| Pull States | Pull common states from a device, e.g., FIB, RIB, CPU and memory usage, etc. |
| PullConfig | Back up the current configurations for rollback |
| PullPackets | Pull packet traces. May compute packet paths and counters and clean traces |
| IP Access | Enable existing tools to send commands or pull output |

Figure 3:
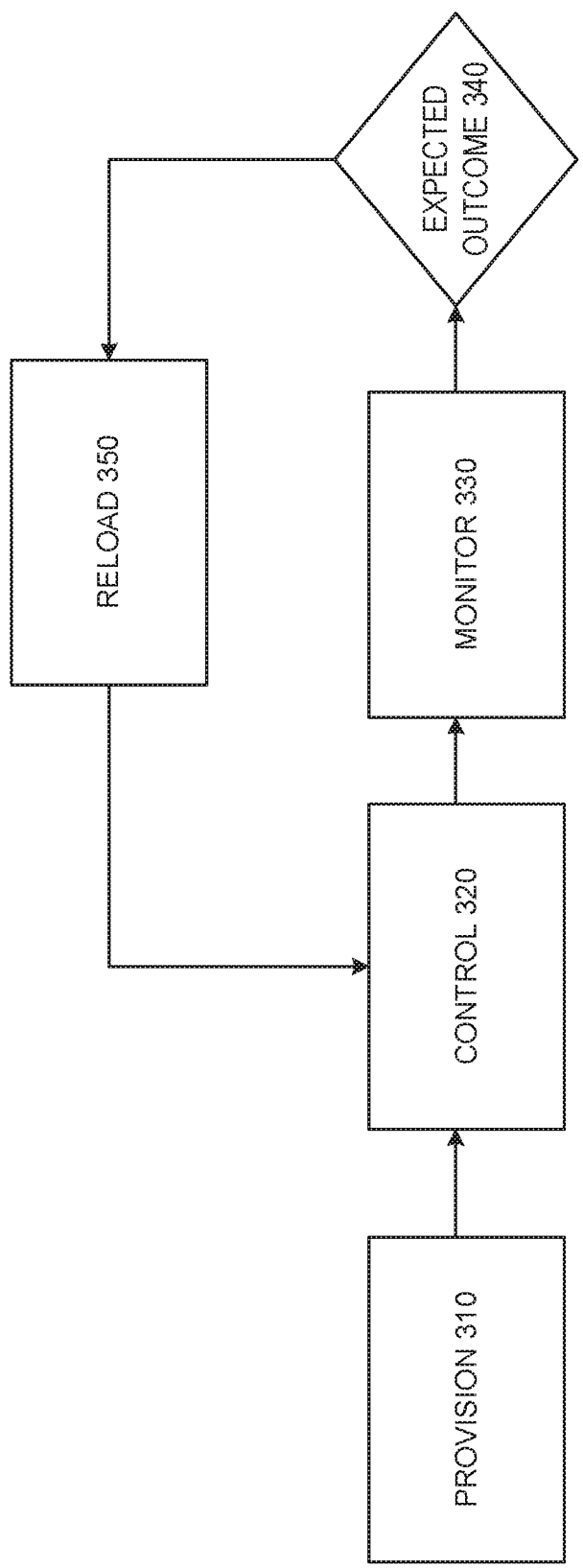
FIG. 3 is a network update validation workflow in accordance with respective examples.

FIG. 3 is a network update validation workflow in accordance with respective examples. As the first step, a provision function 310, e.g., Prepare, is called to take a snapshot of the production environment, spawn VMs and feed those as the input into another provision function, Mockup. Specifically, Prepare includes individual subroutines that may get the necessary topology information, device configurations, boundary route announcements, and VM planning based on topology. Mockup creates the virtual network topology and the emulation boundary, and starts the emulated device software.

After Mockup, the emulated network is ready for testing the update steps. Operators may control/make various network changes 320. For example, operators may choose to apply significant changes like booting a new device OS or reflush the whole configuration with Reload. The operator may also choose to use existing tools for incremental changes via the management plane. The change may then be monitored using the monitor APIs and/or existing management tools that may pull the emulation states for operators 330. The emulation states and the monitor API may then be used to check whether their intent is satisfied 340. In an example, the emulated network adopts the idea of packet level telemetry. Operators specify the packets to be injected and the packets are injected into the emulated network with a pre-defined signature. All emulated devices may capture seen packets, filter and dump traces based on the signature. Traces may be pulled later to the control 250 for validation.

The control may check the output of monitor functions using scripts or using reactive data plane verification tools. If the results are the same as expected, the control 250 may backup the configuration with PullConfig for potential rollback and move back to control to process further changes. Otherwise, operators may revert the current update with Reload, fix the bugs and try again. This process may repeat until validating all update steps. In the end, Destroy is called to release VMs.

The emulated network supports various OS and software running on network devices. The various emulated devices within the emulated network run transparently with heterogeneous software with the emulated network providing unified APIs for users. In an example, containers are as the basic format for isolating devices. Containers isolate the runtime library with less overhead than VM, run well inside VMs on clouds, and, more importantly, isolate virtual interfaces of multiple devices to avoid naming conflicts.

The APIs provided by the emulated network work for all kinds of emulated devices, thus providing a unified layer for connections and facility tools. The heterogeneous device software, however, is packed into different blackbox images by vendors. Re-implementing the APIs for each device is not feasible given the large number of possible devices that may be emulated. Another challenge emulating devices is that most containerized switch OS must boot with interfaces already present, while virtual interfaces can only be put into a container a parent container boots.

Figure 4:
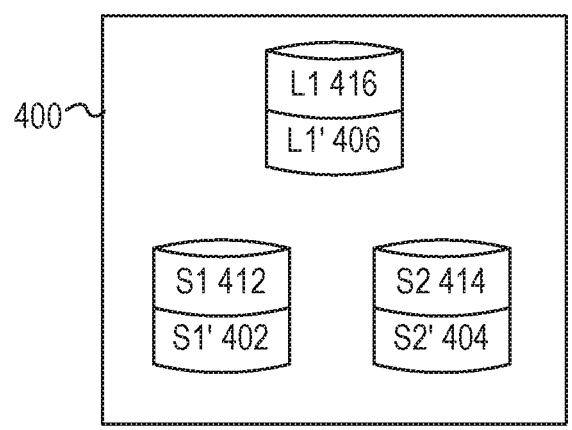
FIG. 4 is a block diagram of physical network containers in accordance with respective examples.

To address these challenges, a unified layer of Physical Network, or PhyNet containers, whose runtime binaries are decoupled from the devices being tested are used. FIG. 4 is a block diagram of physical network containers in accordance with respective examples. The unified layer of containers may hold all the virtual interfaces and is connected as the target topology. In an example, tools, like Tcp-dump, packet injection and pulling scripts, are placed in PhyNet containers. Various APIs of the emulated network are then implemented unifiedly, instead of re-implemented for each device. The actual device software is booted with the corresponding network namespace. Thus, the device software runs without any code changes, the emulated device starts with the physical interfaces already exist. Even if the software reboots or crashes, the virtual interfaces and links remain. The overhead of running PhyNet containers, which are dumb processes for holding network namespaces, are negligible.

In FIG. 4, a virtual machine 400 hosts three different emulated devices. Each emulated device 412, 414, and 416 run its corresponding native software within the VM 400. To provide a common API, PhyNet containers 402, 404, and 406 provide access to the emulated devices. As noted above, a suite of tools may be installed and ran on the PhyNet containers 402, 404, and 406. These tools interface with the emulated devices 412, 414, and 416.

Some native device software is containerized, while some is VM-based. VM-based device images cannot be ran directly on a cloud system, because public cloud systems cannot attach hundreds of virtual interfaces to a VM. In addition, these VM-based devices need to connect with other containers, while maintaining the PhyNet container layer.

In an example, the VM image, kernel-based VM (KVM) hypervisor binary, and a script that spawns the device VM into a container image are packed together. The device VM may then be ran insider a container on a cloud system's VM. Thus, nested VM features on the cloud system is needed.

In addition to emulated devices, the emulated network allows operators to connect real hardware into the emulated topology. For example, an emulated network may mock up a full network and replace an emulated device by the real hardware. This allows testing the hardware behavior in production environments. In short, the real hardware is connected to a "fanout" switch, which is prevalent in hardware testbeds. The "fanout" switch tunnels each port to a virtual interface on a server. These virtual interfaces are managed by a PhyNet container and are bridged with virtual links connecting the emulated network overlay.

There are two types of virtual links that may be used in the described emulated network, one for data plane and the other for management plane. The virtual data plane links are seen as Ethernet links by the devices and may be isolated. In addition, the virtual links may go through complicated underlying networks, including the various cloud systems and the Internet. This enables an emulated network to connect real hardware, as mentioned above, and VMs.

Figure 5:
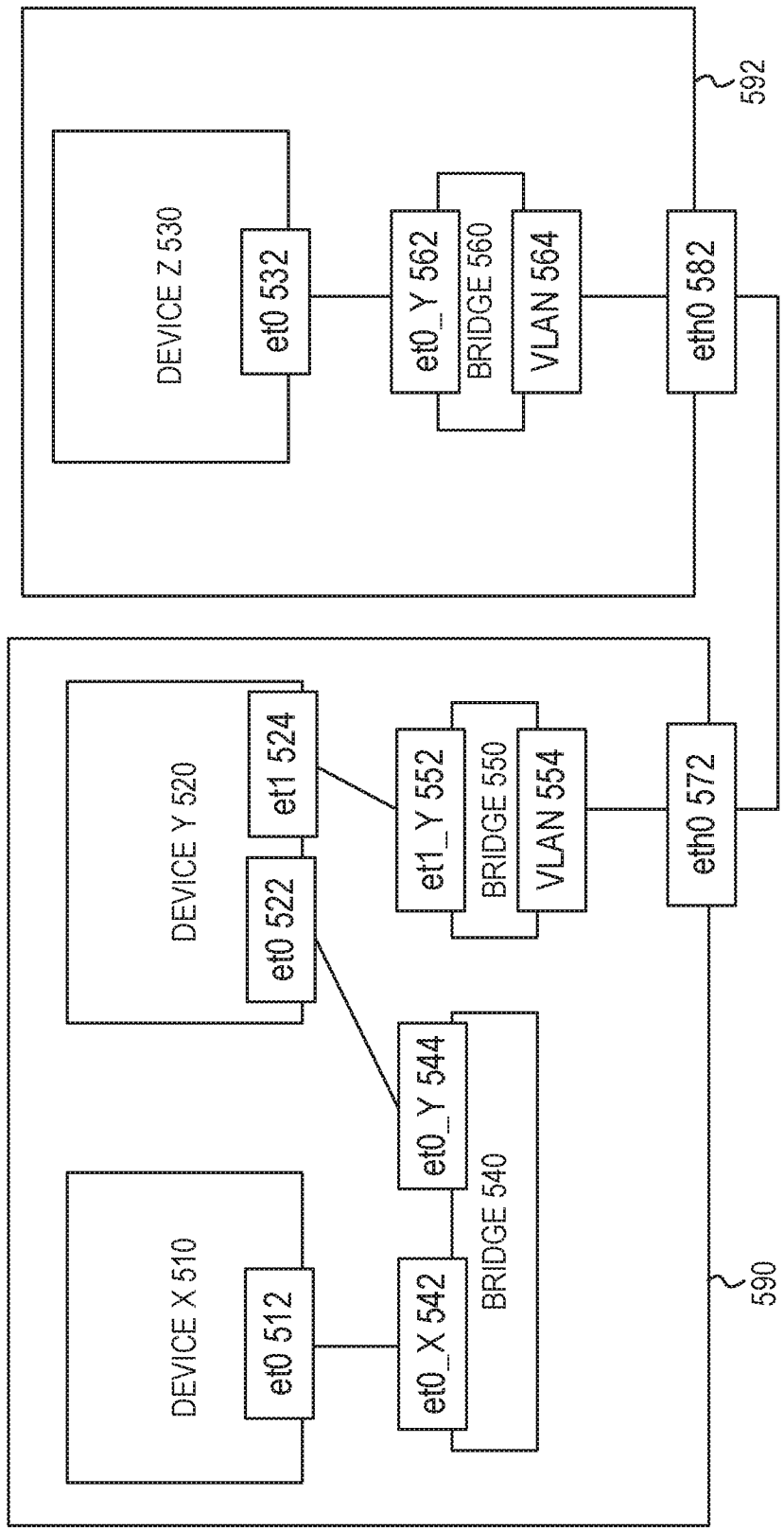
FIG. 5 is a block diagram of virtual data links in accordance with respective examples.

In an example, virtual extensible local area network (VXLAN) may be used as the tunneling protocol. The tunneling protocol emulates an Ethernet link, and the outer header (UDP) allows connections across heterogeneous infrastructures behind NAT since load balancers support UDP well. NAT traversing may be configured using NAT rules on the load balancers, in local iptables and UDP hole punching. As shown in FIG. 5, each device interface is a member of veth pairs, with the other side plugged into a bridge. Each bridge also has a VXLAN tunnel interface (if the remote device is on another VM), or another local virtual Ethernet (veth) interface. This is transparent to the device containers. Each virtual link may be isolated by assigning a unique VXLAN ID to each link. The control ensures that the same ID does not collide on the same VM.

FIG. 5 is a block diagram of virtual data links in accordance with respective examples. In an example of a portion of an emulated network, two VMs 590 and 592 are used to emulate three different devices 510, 520, and 530. Each of the devices 510, 520, and 530 is a member of a veth pair connected to a bridge 540, 550 or 560. For example, the device 510 includes a network interface 512 that connects to a network interface 542 on the bridge 540. The device 520 includes a similar veth pair, with a network interface 522 connected to a network interface 544 on bridge 540. The device 520 includes a second network interface 524 that connects to a bridge 550 via a network interface 552. The device 530 that runs on VM 592 has a network interface 532 that connects to a bridge 560 via a network interface 562 on the bridge 560. The two virtual machines 590 and 592 are connected via a network. The VM 590 includes a network interface 572 that connects to a network interface 582 of VM 592.

Various tools have been developed based on the direct IP access to devices through a management plane. A management plane is an out-of-band channel used for management. The emulated network may provision this management plane automatically. Operators, therefore, may run their management tools without any modification, perform incremental configuration changes with the tools, and pull device states, just like in the production environment.

Figure 6:
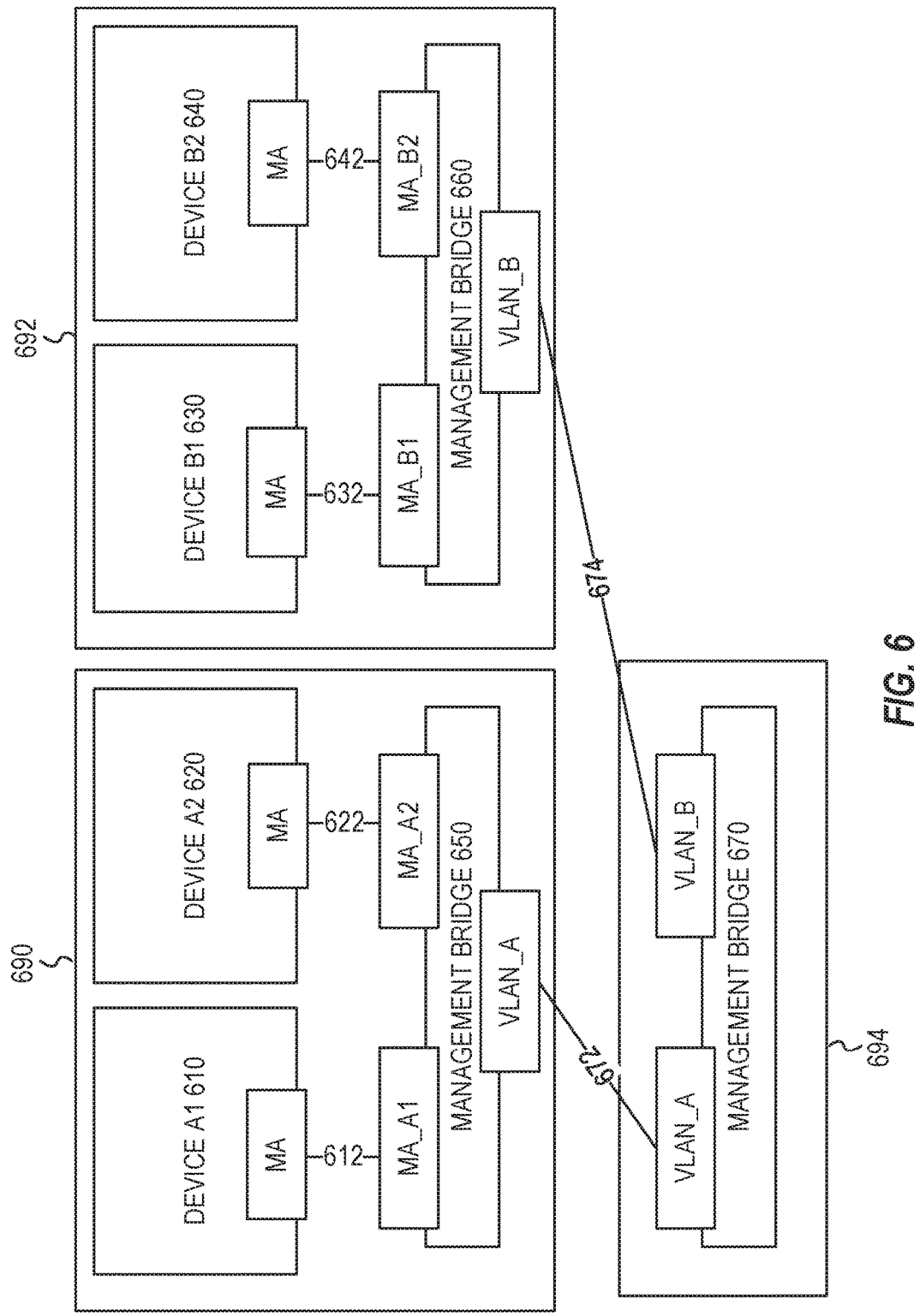
FIG. 6 is an example architecture of a management plane in accordance with respective examples.

The emulated network may deploy a jumpbox, e.g., a linux jumpbox is used in an example. Production networks usually requires a jumpbox as well. The jumpbox connects all emulated devices together. One known possible issue with connecting all emulated devices together is referred to as an L2 storm. In an example, the overlay uses a tree structure. FIG. 6 is an example architecture of a management plane in accordance with respective examples.

Each VM 690 and 692 sets up a bridge 650 and 660. The bridges 650 and 660 connect to a jumpbox 694 via VXLAN tunnels 672 and 674. Emulated devices 610, 620, 630, and 640 connect to the bridge 650 or 660 of the local VM 690 or 692 using veth pairs 612, 622, 632, and 642, respectively. Other jumpboxes, like a Windows-based jumpbox, may connect to the jumpbox 694 via VPN (not shown). This architecture is efficient for management of traffic between jumpboxes and devices, since all devices connect to the jumpbox without relay. Finally, the jumpbox 694 may run a DNS server for the management IPs.

As noted above, an emulated network may have boundaries beyond which the network is not emulated. Outside the emulation boundary, the behavior of the various network devices is not fully modeled. However, the routing messages from external networks, and the reactions of external devices to the dynamics inside the emulated network, are essential for validation. One aspect to solving this dilemma is based on the observation that most production networks do not blindly flood or accept route updates. Upon dynamics in a location, there are policies or protocols that may limit the range of impacts. If the stopping boundary of the impacts is found, the networks outside of the boundary may be treated as static during the emulation of the network.

Figure 7A:
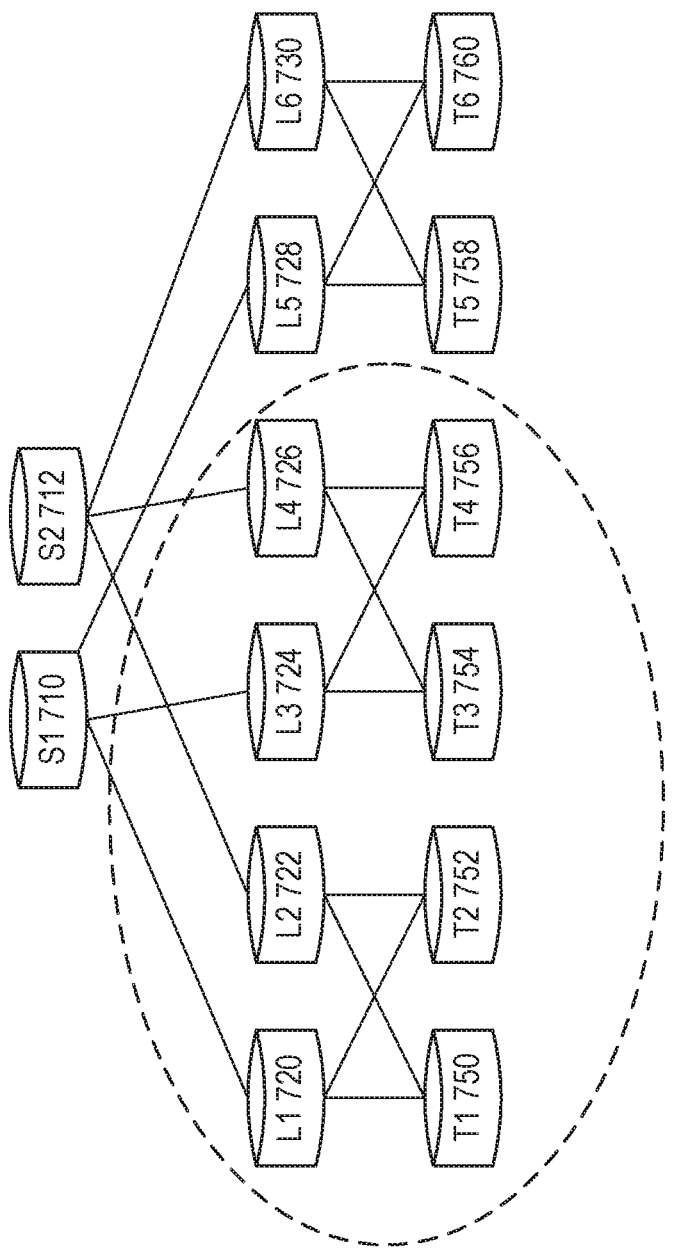
FIG. 7A is a network diagram showing an unsafe static boundary to emulate.
Figure 7B:
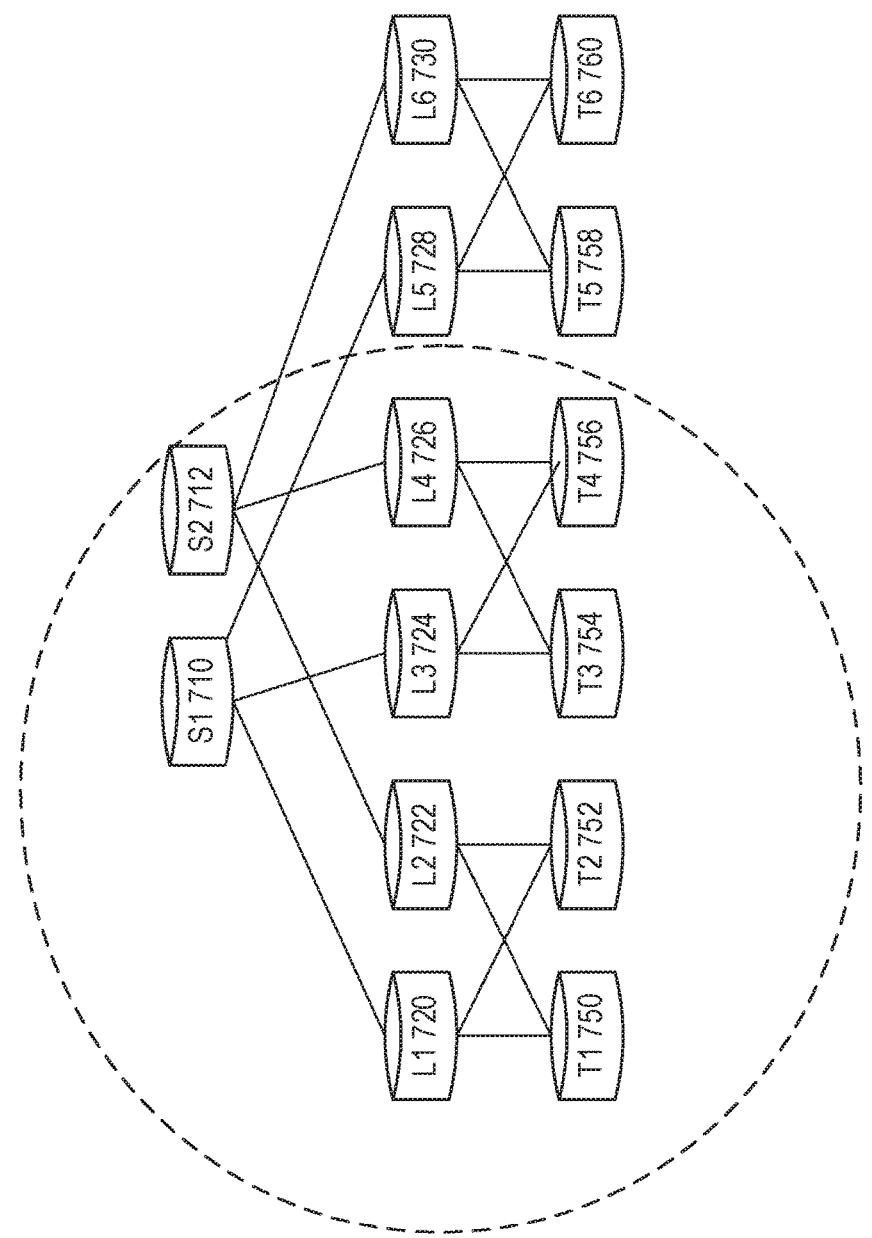
FIG. 7B is a network diagram showing an unsafe static boundary to emulate in accordance with respective examples.
Figure 7C:
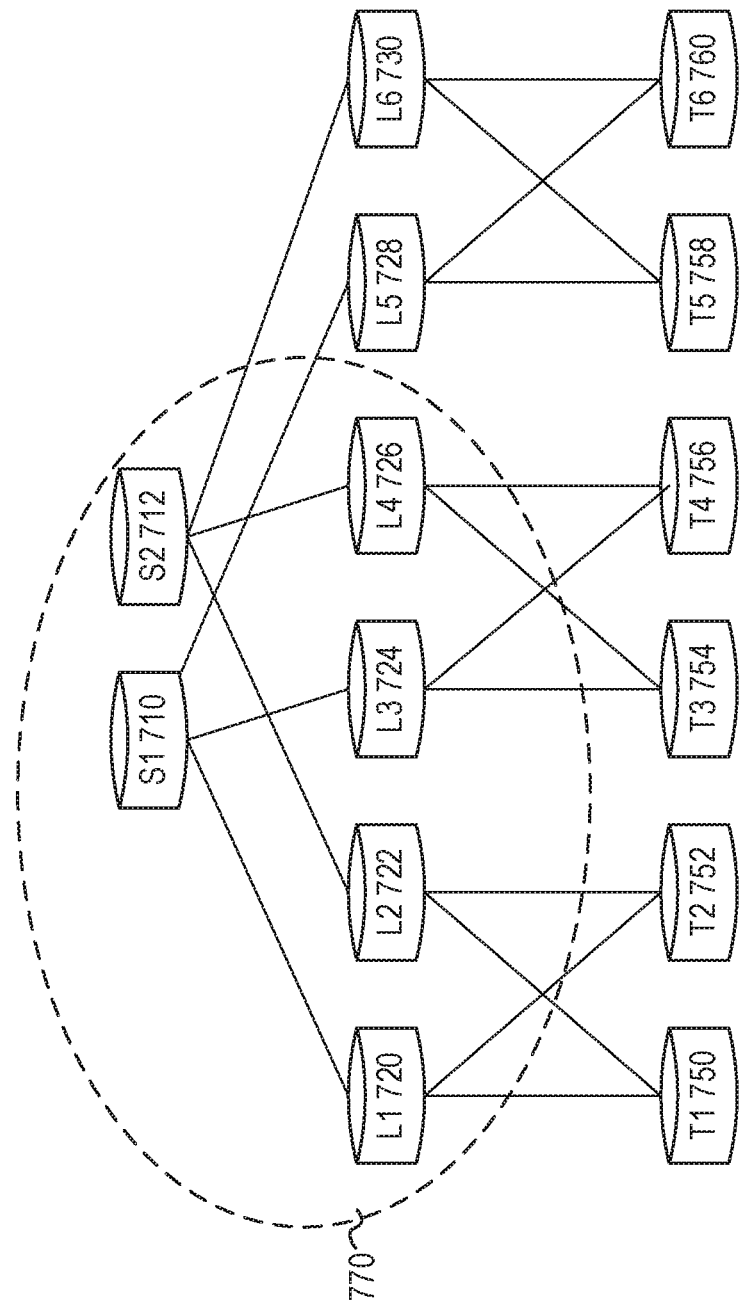
FIG. 7C is a network diagram showing an unsafe static boundary to emulate in accordance with respective examples.

In an emulated network, an emulated device is considered as a device running real software and configurations. A network, a portion of which is to be emulated is shown in FIGS. 7A-7C. For example, in FIG. 7A, T1-4 and L1-4 are all emulated devices. Furthermore, T1-4 are considered internal devices since their neighbors are all emulated devices, and L1-4 boundary devices since they have neighbors outside the boundary. External devices that are directly connected to boundary devices are considered speaker devices. Other external devices are excluded from emulation. For instance, in FIG. 7A, S1-2 are speaker devices and are connected to emulated devices, while T5-6 and L5-6 are part of the emulated network.

In an example, speaker devices do not run the real software or configurations of the emulated devices. Instead, simplistic software is ran with two properties. First, the speaker device keeps the link(s) and the routing session(s) alive with boundary devices, so that the existence of the boundary is transparent to emulated devices. Second, they are fully programmable for sending out arbitrary routing messages.

In an example, speaker devices may be static, meaning the speaker devices will not react to any routing messages from boundary devices. Instead, during Prepare, the control installs the routing messages to be sent by each boundary device. After Mockup, the speaker devices reliably announce these messages. The reason of making them static is to avoid any assumptions on the behavior of external devices.

The design of static speaker devices raises a concern: is the emulation still correct when operators apply changes on the emulated devices? In other words, in the real network, will the devices represented by speaker devices react to the changes, and become inconsistent with the static design?

In FIG. 7A, on a datacenter network which uses Border Gateway Protocol (BGP), T1-T4 750, 752, 754, and 756 and L1-L4 720, 722, 724, and 726 are ran as emulated devices and S1-S2 710 and 720 as speaker devices. Devices L5-L6 728 and 730 and T5-T6 758 and 760 are outside and not part of the emulated network. If T4 756 gets a new IP prefix (10.1.0.0/16), the announcements of this prefix will stop at S1-S2 710 and 712 in emulation. However, in real networks, S1-S2 710 and 712 should propagate this prefix to L1-L2 720 and 722. Given this potential inconsistency, we call the boundary in FIG. 7A unsafe.

A safe static boundary may be defined as a collection of boundary devices that can guarantee the consistency between the emulation and the real network, even with dynamics on the topology and configurations of emulated devices. For example, FIG. 7B has a safe boundary at S1 710 and S2 720. Announcements of the new IP prefix can reach L1-L2 720 and 722 and T1-T2 750 and 752, since S1 710 and S2 712 are emulated devices this time. The safeness of S1 710-S2 720 as a boundary under arbitrary route and topology updates on T1-T2 750 and 752 and L1-L4 720, 722, 724, and 726.

As part of the emulated network setup, safe static boundaries are identified. During prepare, the control uses the must-have emulated devices, which are specified by operators, as input. The control then finds a safe static boundary inside which all must-have deices are emulated.

In an example, the emulated network is a BGP network. BGP is not only the de facto routing protocol between autonomous systems (ASes) in the Internet, but also widely used inside datacenter networks. As a variant of distance vector protocols, BGP lets each router report which IP prefixes it can reach to its neighbors. In the emulation, a change on configurations or topology can trigger changes on IP prefixes reachability from certain devices. Such changes propagate among the emulated devices.

In an emulated BGP network, a boundary is safe if no route update originated in an emulated device passes through the boundary more than once. Since speaker devices do not need to react if all route updates originated in emulated devices stay within the emulated network, or exit without coming back to the emulated network the boundary is safe. This statement applies to all distance vector routing protocols.

This statement regarding determining if a boundary is safe may also be stated as if the boundary devices of an emulated BGP network are within a single AS and all the speaker devices are in different ASes, the boundary is safe. If all boundary devices are within a single AS, no route updates can exit the boundary and return because, to avoid routing loops, BGP does not allow sending route updates back to the same AS. This behavior provides a sufficient condition for checking whether a boundary is safe in a BGP network. As safe boundary is shown in FIG. 7B, the boundary is safe because S1 710 and S2 712 are in a single AS.

Another way to find a safe boundary is to determine if the boundary devices of an emulated BGP network are in ASes that have no reachability to each other via external networks, the boundary is safe. After a route update is sent out from a boundary device ($\beta$) to a speaker device, the route update will never reach any boundary devices because other boundary devices are either in the same AS as $\beta$, or have no connectivity to $\beta$.

FIG. 7C illustrates this example. For instance, assuming operators only want to emulate L1-L4 720-726 but not T1-T4 750-756, FIG. 7C presents a safe boundary 770. This is due to boundary devices S1-S2 710-712, L1-L2 720-722, and L3-L4 724-726 are in three different ASes that have no reachability to each other without passing the emulated network zone. For example, when link S1-L1 fails, L1 720 will send withdraw messages for the routes it learns from S1 710 to T1 750 and T2 752, but T1 750 or T2 752 will not send the withdraw messages to L2 722 because L1 720 and L2 722 are both in the same AS. S1-S2 710-712 or L3-L4 724-726 are not affected either, since they are not reachable from T1 750 or T2 752. Similar situations happen in T3-T4 723-726 and L5-L6 728-730.

Based upon the above a safe static boundary for datacenters running BGP may be found. Given a set of input devices, searching for an optimal boundary which is safe is still difficult in a general network. However, for a Clos-like datacenter network, the control may use a heuristic based on its special properties: (i) The whole network topology is layered; (ii) No "valley routing" is allowed; and (iii) The border switches connected to wide area network (WAN) are on the highest layer and usually share a single AS number.

The topology may be treated as a multi-root tree with border switches being the roots. Starting from each input device, all its parents, grandparents are added until the border switches into the emulated device set. This is essentially a breadth-first search (BFS) on a directional graph, which is constructed by replacing the links in the topology with directional child-to-parent edges. Algorithm 1 below shows an example BFS process.

| Algorithm 1: FindSafeDCBoundary(G, D) |
| --- |
| 1  [Input] G: datacenter network topology |
| 2  [Input] D: input devices by operators to be emulated |
| 3  [Output] $D^1$: all devices to be emulated |
| 4  $D^1 \leftarrow \emptyset$, |
| 5  while D /= $\emptyset$ do |
| 6      d ← D.pop( ); |
| 7      $D^1$.add(d); |
| 8      if G.isHighestLayerDevice(d) then |
| 9          continue; |
| 10     upperDevices ← G.allConnectedUpperLayerDevices(d); |
| 11     foreach dev in upperDevices do |
| 12         if dev / D ∪ $D^1$ then |
| 13             D.add(dev) |
| 14  return $D^1$; |

Safe boundaries for other types of networks may also be found. For example, safe boundaries may be found in an open shortest path first (OSPF) network. OSPF is a link state routing protocol and is widely used in large scale networks as interior gateway protocol (IGP). Unlike BGP, routers in OSPF report the state (e.g., liveness, weights, etc.) of their neighboring links to a database which may be located in a designated router (DR) and/or a backup designated router (BDR). A state change on a link triggers routers attached to the link to report the new link state to DR and BDR. To ensure that validating changes on emulated devices does not require reactions from speaker devices, if the links between boundary devices and speaker devices remain unchanged in the emulated network, and DR(s) and BDR(s) are emulated devices, the boundary of an OSPF network is safe.

This is because there is nothing new for speaker devices to report if their links remain unchanged: DR(s) and BDR(s) will always react to changes, since they are always emulated. For a boundary of an OSPF network to be safe, both ends of links that may suffer changes must be emulated devices. The same conclusion applies for the Intermediate System-Intermediate System (IS-IS) protocol.

Another type of network that may be emulated is a Software-defined networks (SDN). SDN usually runs distributed routing protocols like BGP or OSPF for the connectivity between the centralized controller and network devices. For the data network, a boundary is safe if the emulated network includes all devices whose states may impact the controller's decision.

In an example, the emulated network is generated by the APIs described above. For example, the prepare API generates the input for Mockup. The input may include generating the topology and configurations, and spawning the VMs. The input for Prepare includes a list of device host names that are to be emulated. Then the control interacts with internal network management services and clouds to execute the following steps.

For all devices in the input list, the control identifies the locations in the physical topology and computes a safe boundary. The control may then pull all the related topology, device configurations and routing states snapshots. All the information may then be preprocessed and rearranged into a format that the mockup API understands. The preprocessing may include adding unified SSH credentials into the configurations, parsing and reformatting routing states, etc.

The control may then spawn VMs on-demand using cloud APIs. This is a key to scalability and reducing cost. In an example, VM images may be built and used that include all the prerequisites and supported device container images installed. Based on the emulation topology, like how many devices and which types they are, the control estimates the total required resources and start VMs using the pre-built image.

There are practical considerations about the VM types. The emulated network may use nested VM feature, if there are VM-based devices. Regarding the VM size, spawning a large number of small VMs may put a heavy burden on the control. Meanwhile, each VM should not be too large because the kernel may become less efficient in packet forwarding as the number of virtual interfaces grows beyond thousands. Furthermore, container-based devices are generally more CPU intensive, while VM-based devices consume more memory. Considering all these, the control may select a 4-core, 8 GB memory VM model for container-based devices, and a 4-core, 14 GB memory model for VM-based devices.

Mockup is a core part of building the emulated network. In an example, Mockup has two steps. First, the PhyNet layer and the topology connections are setup. Second, the device software is started and ran.

The emulated network may run on cloud VMs that may fail, e.g., unexpected VM reboot, which can result in incorrect states in the emulation. Therefore, an emulated network may validate its own health to prevent failures due to incorrect states in the emulation. A built-in health check module may be used via the APIs. A fresh Mockup starts the health check and repair daemon in the last step. The daemon periodically checks the device uptime, and link status by injecting and capturing packets from both ends. Once it finds problems, it alerts users and attempts to recover by Clear and Mockup merely for problematic VMs or devices.

Figure 8:
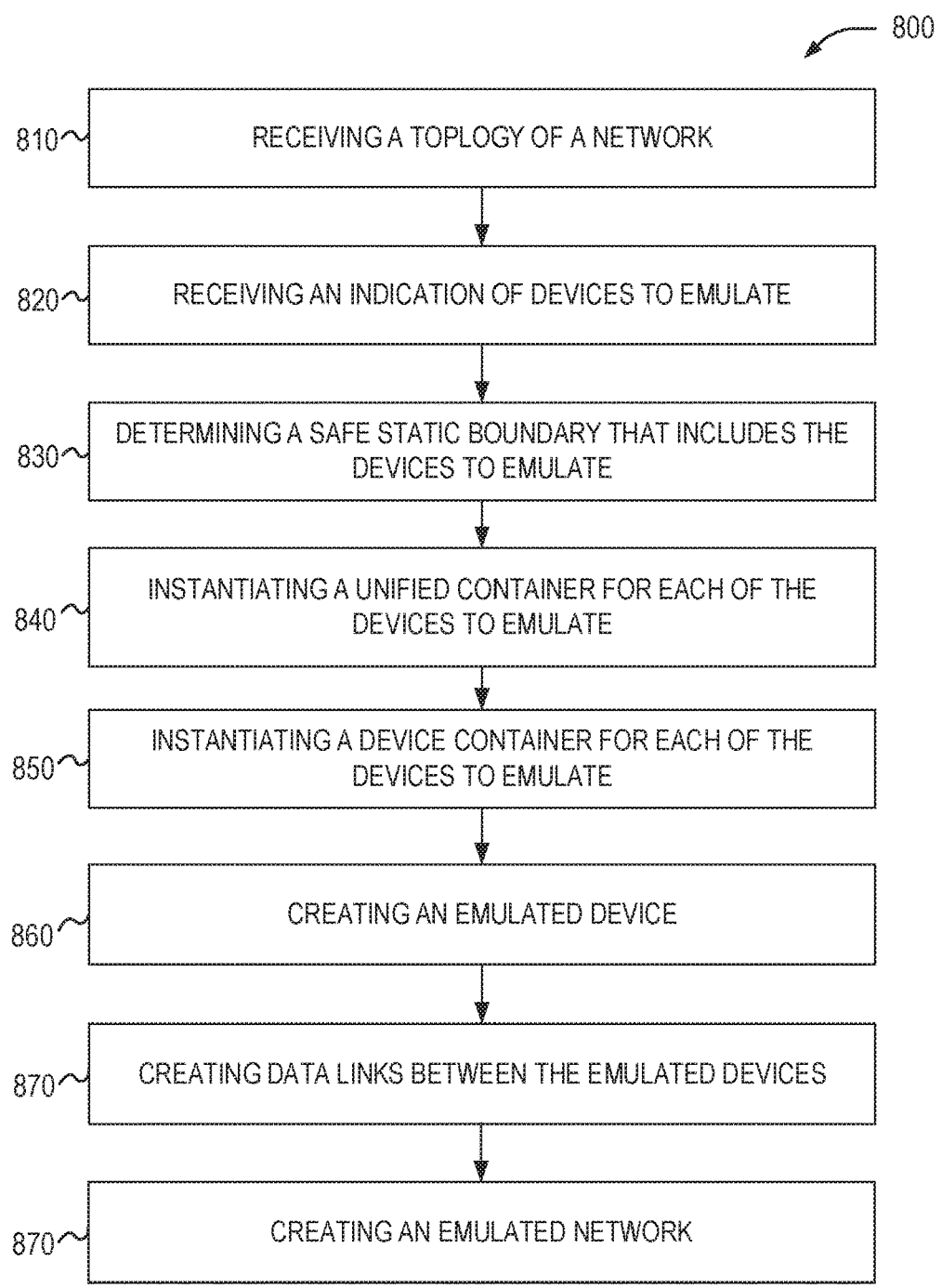
FIG. 8 is a flow chart for emulating a network in accordance with respective examples.

FIG. 8 is a flow chart of a method 800 for emulating a network in accordance with respective examples. In an operation 810, a network topology of network is received. The network topology includes information regarding devices and connections between those devices in the network. The network topology may also include configurations of devices on the network, as well as routes from the network's boundary. The topology, therefore, helps define the layout and configuration of the network.

In an operation 820, an indication of one or more devices to emulate is received. This is the list of devices that will be part of the emulated network. In an example, the emulated network includes only the devices from the list of devices. In an example, an additional device is added to the devices that will be emulated devices. In an operation 830, a safe static boundary that includes the list of devices is determined. As described above, a safe static boundary includes devices that are allow the emulated devices to be faithfully emulated. Accordingly, an additional device may be added to the devices to emulate to ensure the emulated network has a safe static boundary.

In operations 840 and 850, a unified and a device container is instantiated for each device that will be emulated. In an example, this includes the list of devices. In an example, the devices to emulate will include the list of devices and an additional device added to ensure a safe static boundary. In an operation 860, the unified container and device container are linked to create an emulated device. The device container may run device specific software. The unified container may integrate with the device container via various API calls. In addition, the unified container provides a common API across all emulated devices, allowing heterogenous devices to be controlled via a single API.

In an operation 870, data links are created between the emulated devices. How the various emulated devices are connected may be based upon the received topology. In addition, the topology may describe the type and capacity of the link. In an operation 880, an emulated network is created from the emulated devices and data links. In addition, speaker devices may be created and added to the emulated network.

Figure 9:
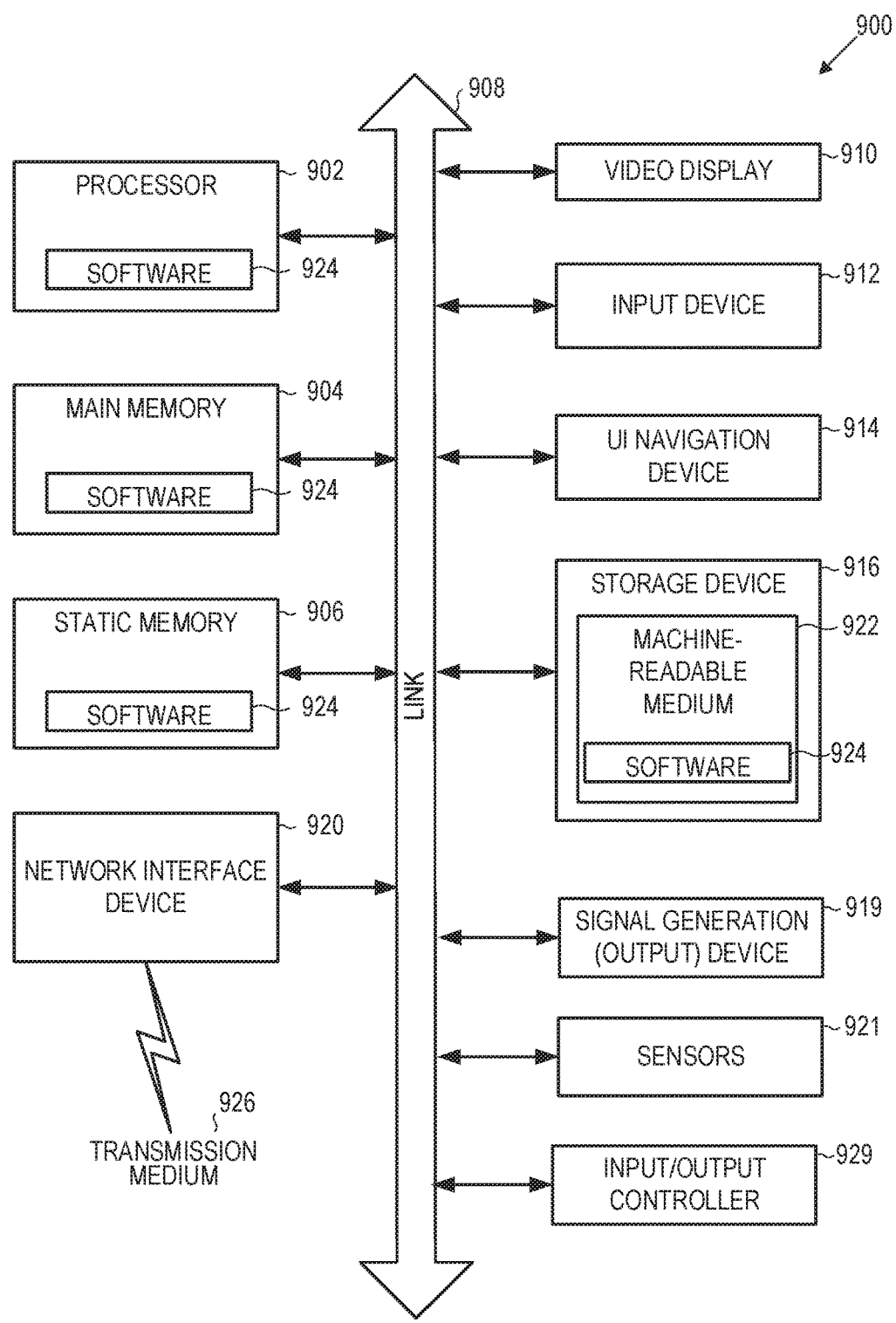
FIG. 9 is an example computing device that can be used in conjunction with the technologies described herein.

FIG. 9 is an example computing device that can be used in conjunction with the technologies described herein. In alternative embodiments, the computing device 900 may operate as a standalone device or may be connected (e.g., networked) to other computing devices. In a networked deployment, the computing device 900 may operate in the capacity of a server communication device, a client communication device, or both in server-client network environments. In an example, the computing device 900 may act as a peer computing device in peer-to-peer (P2P) (or other distributed) network environment. The computing device 900 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The computing device 900 may further include a display unit 910, an input device 912 (e.g., a keyboard), and a user interface (UI) navigation device 914 (e.g., a mouse). In an example, the display unit 910, input device 912, and UI navigation device 914 may be a touch screen display. In an example, the input device 912 may include a touchscreen, a microphone, a camera (e.g., a panoramic or high-resolution camera), physical keyboard, trackball, or other input devices.

The computing device 900 may additionally include a storage device (e.g., drive unit) 916, a signal generation device 919 (e.g., a speaker, a projection device, or any other type of information output device), a network interface device 920, and one or more sensors 921, such as a global positioning system (GPS) sensor, compass, accelerometer, motion detector, or another sensor. The computing device 900 may include an input-output controller 929, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 916 may include a computing-readable (or machine-readable) storage media 922, on which is stored one or more sets of data structures or instructions 924 (e.g., software) embodying or utilized by any one or more of the techniques or functions described herein. In an example, at least a portion of the software may include an operating system and/or one or more applications (or apps) implementing one or more of the functionalities described herein. The instructions 924 may also reside, completely or at least partially, within the main memory 904, within the static memory 906, and/or within the hardware processor 902 during execution thereof by the computing device 900. In an example, one or any combination of the hardware processor 902, the main memory 904, the static memory 906, or the storage device 916 may constitute computing device (or machine) readable media.

The instructions 924 may cause the machine 900 to execute the flow diagrams of FIG. 8. In one embodiment, the instructions 924 can transform the general, non-programmed machine 900 into a particular machine (e.g., specially configured machine) programmed to carry out the described and illustrated functions in the manner described.

While the computer-readable storage media 922 is illustrated as a single medium, a "computer-readable storage media" or "machine-readable storage media" may include a single medium or multiple media (e.g., a centralized or distributed database, and/or associated caches and servers) configured to store the one or more instructions 924.

In an example, a computer-readable storage media or machine-readable storage media may include any medium that is capable of storing, encoding, or carrying instructions for execution by the computing device 900 and that cause the computing device 900 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.8 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 920 may use the transfer protocols to transmit data using transitory propagating signals.

In an example, the network interface device 920 may include one or more physical jacks (e.g., Ethernet, coaxial, or phone jacks) or one or more antennas to connect to the communications network 926. In an example, the network interface device 920 may include one or more wireless modems, such as a Bluetooth modem, a Wi-Fi modem or one or more modems or transceivers operating under any of the communication standards mentioned herein. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. In an example, a transmission medium may include any intangible medium that is capable of storing, encoding or carrying instructions for execution by the computing device 900, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for emulating a network, the system comprising:
 a processing unit configured to perform operations, the operations comprising:
  receiving a topology of a network, the topology comprising devices within the network;
  receiving an indication of a device within the network to emulate;
  determining a safe static boundary within the network that comprises a list of devices to emulate that includes the device in the indication of the device to emulate, the safe static boundary based upon the network topology:
  for each device in the list of devices to emulate:
   instantiating a unified container;
   instantiating a device container to run device specific software, the unified container interfaces with the device specific software; and
   creating an emulated device comprising the unified container and the device container of the device, the unified container provides a common application programming interface across all emulated devices;
  creating data links between the emulated devices based upon the network topology; and creating an emulated network using the emulated devices.

2. The system of claim 1, wherein the device specific software comprises different operating systems.

3. The system of claim 1, wherein the operations further comprise introducing a change to the device specific software of a device.

4. The system of claim 3, wherein the operations further comprise monitoring emulation states of the emulated devices to determine if the change was successful.

5. The system of claim 4, wherein the operations further comprise rolling back the change based upon determining the change was not successful.

6. The system of claim 1, wherein the operations further comprise instantiating a virtual machine, wherein the virtual machine hosts multiple emulated devices.

7. The system of claim 1, wherein determining a safe static boundary within the network comprises adding a boundary device to the list of devices to emulate, the boundary device not in the indication of devices to emulate.

8. The system of claim 1, wherein creating an emulated network using the emulated devices comprises connecting a speaker device to a boundary device.

9. A method, performed by a computing device, for emulating a network, the method comprising:
   receiving a topology of a network, the topology comprising devices within the network;
   receiving an indication of a device within the network to emulate;
   determining a safe static boundary within the network that comprises a list of devices to emulate that includes the device in the indication of the device to emulate, the safe static boundary based upon the network topology;
   for each device in the list of devices to emulate:
      instantiating a unified container;
      instantiating a device container to run device specific software, the unified container interfaces with the device specific software; and
      creating an emulated device comprising the unified container and the device container of the device, the unified container provides a common application programming interface across all emulated devices;
   creating data links between the emulated devices based upon the network topology; and
   creating an emulated network using the emulated devices.

10. The method of claim 9, wherein the device specific software comprises different operating systems.

11. The method of claim 9, further comprising introducing a change to the device specific software of a device.

12. The method of claim 11, further comprising monitoring emulation states of the emulated devices to determine if the change was successful.

13. The method of claim 12, further comprising rolling back the change based upon determining the change was not successful.

14. The method of claim 9, further comprising instantiating a virtual machine, wherein the virtual machine hosts multiple emulated devices.

15. The method of claim 9, wherein determining a safe static boundary within the network comprises adding a boundary device to the list of devices to emulate, the boundary device not in the indication of devices to emulate.

16. The method of claim 9, wherein creating an emulated network using the emulated devices comprises connecting a speaker device to a boundary device.

17. A non-transitory computer-readable medium storing instructions that, when executed by a computer system, cause the computer system to perform operations comprising:
   receiving a topology of a network, the topology comprising devices within the network;
   receiving an indication of a device within the network to emulate;
   determining a safe static boundary within the network that comprises a list of devices to emulate that includes the device in the indication of the device to emulate, the safe static boundary based upon the network topology;
   for each device in the list of devices to emulate:
      instantiating a unified container;
      instantiating a device container to run device specific software, the unified container interfaces with the device specific software; and
      creating an emulated device comprising the unified container and the device container of the device, the unified container provides a common application programming interface across all emulated devices:
   creating data links between the emulated devices based upon the network topology; and
   creating an emulated network using the emulated devices.

18. The computer-readable storage media of claim 17, wherein the device specific software comprises different operating systems.

19. The computer-readable storage media of claim 17, wherein the operations further comprise introducing a change to the device specific software of a device.

20. The computer-readable storage media of claim 19, wherein the operations further comprise monitoring emulation states of the emulated devices to determine if the change was successful.

* * * * *